United States Patent [19]

Klingel

[11] Patent Number: 5,128,508
[45] Date of Patent: Jul. 7, 1992

[54] NOZZLE FOR LASER CUTTING HEAD

[75] Inventor: Hans Klingel, Moglingen, Fed. Rep. of Germany

[73] Assignee: Trumpf GmbH & Company, Ditzingen, Fed. Rep. of Germany

[21] Appl. No.: 682,424

[22] Filed: Apr. 8, 1991

[30] Foreign Application Priority Data

Apr. 14, 1990 [DE] Fed. Rep. of Germany ... 9004335[U]

[51] Int. Cl.$^5$ ............................................. B23K 27/00
[52] U.S. Cl. ........................... 219/127.61; 219/121.72
[58] Field of Search .................... 219/121.67, 121.72, 219/121.63, 121.64

[56] References Cited

U.S. PATENT DOCUMENTS

| | | | |
|---|---|---|---|
| 4,377,735 | 3/1983 | Minamida et al. | 219/121.85 |
| 4,467,171 | 8/1984 | Ramos | 219/121.67 |
| 4,774,392 | 9/1988 | Orita | 219/121.63 |
| 4,782,496 | 11/1988 | Couturier | 372/109 |

*Primary Examiner*—C. L. Albritton

[57] ABSTRACT

A nozzle assembly for a laser cutting head has a receptacle of insulating material of generally annular cross section with a central passage therethrough. A conductive insert has a body portion of generally annular cross section seated in the receptacle passage and it has a central passage which is threaded. Threadably engaged in the threaded passage of the insert is the threaded neck of a conductive nozzle which has a central passage extending therethrough, and a conductor extends through the insulating receptacle from the insert.

16 Claims, 1 Drawing Sheet

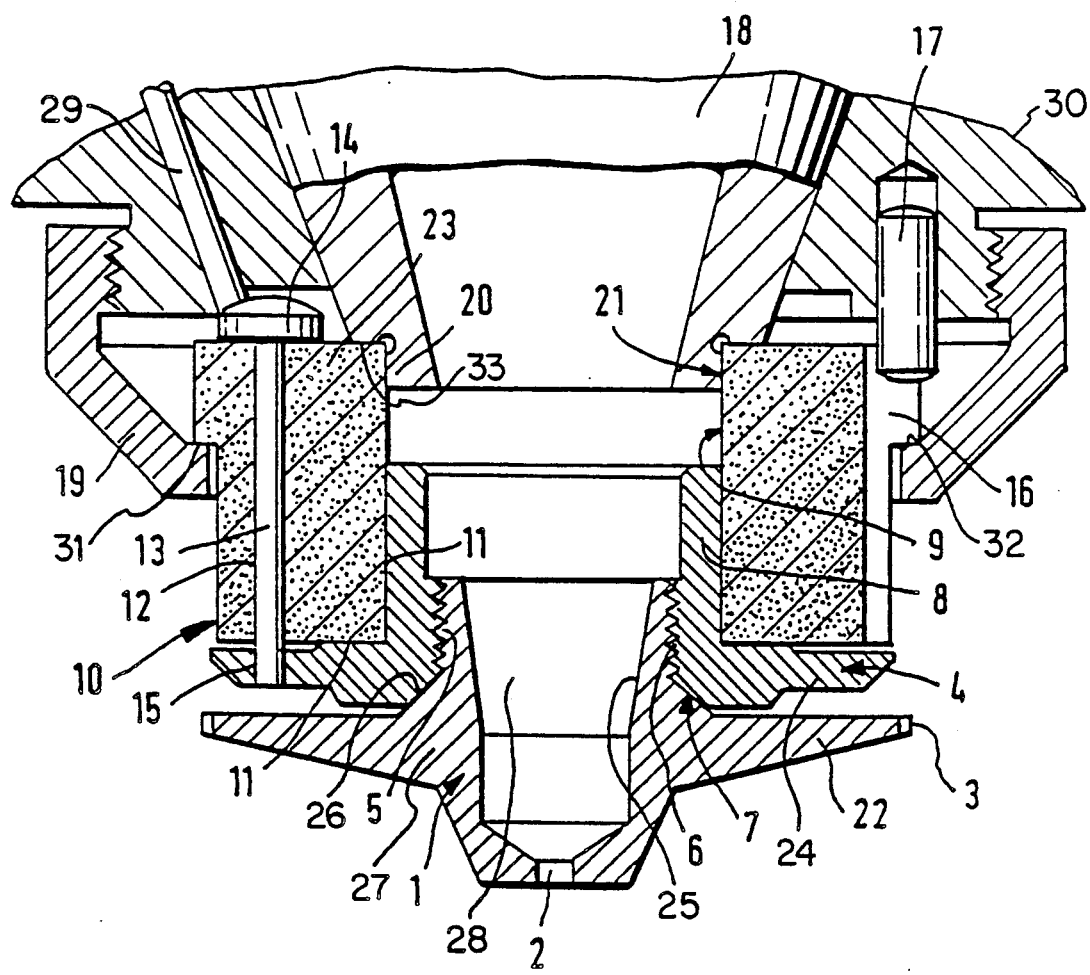

NOZZLE FOR LASER CUTTING HEAD

BACKGROUND OF THE INVENTION

The present invention relates to cutting heads and, more particularly, to nozzle assemblies for laser cutting heads which employ capacitance or like measurement to control the spacing of the nozzle from the surface of the workpiece.

For cutting metal workpieces, laser cutting machines have a laser cutting head with a nozzle at the end adjacent the workpiece. The laser cutting head includes a lens system which focuses the laser beam through an aperture in the nozzle. In order to obtain uniform cutting action, it is necessary for the focal point of the laser beam to be at an optimum distance from the surface of the workpiece. If the workpiece to be cut is not perfectly flat, it is necessary for the focal point of the beam, and generally the entire laser cutting head, to be moved upwardly and downwardly to maintain the desired spacing of the focal point relative to the surface of the workpiece.

To effect precision movement of the head in this manner, it is necessary to have a system for measuring the distance between the surface of the workpiece and the nozzle. Although mechanical and other methods may be used for this measurement, the distance between workpiece and nozzle is readily determined by measuring variations in capacitance without mechanical contact. To be able to measure the capacitance, an electrically conductive nozzle must be supported in a non-conductive receptacle in the cutting head, and the electrically conductive nozzle must be electrically connected by a conductor to the measuring instrument.

Since the nozzle is a part which must be periodically replaced, some prior devices designed have it as a part which may be readily separated from the receptacle, and provided for connecting quickly and safely the nozzle and the receptacle by means of complementary screw threaded surfaces. One nozzle assembly employing this type of construction has had a receptacle with an inner or female screw thread in which is engaged the outer or male screw thread of the nozzle. A conductive path is formed by a metallized coating on the screw thread of the receptacle, and it is connected by a wire in the receptacle to a conductive contact point on the side opposite the nozzle. To center the nozzle in the receptacle and the receptacle in relation to the laser cutting head, conical surfaces are usually provided on the receptacle, which is kept from twisting relative to the laser cutting head by a projecting nose.

The disadvantage to this prior art structure is that the screw thread in the receptacle, which is usually of ceramic material, is relatively difficult to produce, and the metallizing of the threads is expensive and imprecise. Moreover, this screw thread is often very brittle and there is a problem of the metal in the screw threads wearing and tearing. This results in a poor electrical connection between the nozzle and the receptacle, and thereby to the measuring instrument.

It is an object of the invention to provide a novel nozzle assembly for a laser cutting head which utilizes a receptacle which is easy to manufacture, which provides facile and durable screw threaded engagement of the nozzle on the receptacle, and which enables a good conductive path from the nozzle to the measuring apparatus.

It is also an object to provide such a novel nozzle assembly which may be fabricated readily and economically and which may be readily assembled and disassembled.

Another object is to provide such a nozzle assembly which will enable ready replacement of the nozzle and which exhibits relatively long life for the remaining components.

SUMMARY OF THE INVENTION

It has now been found that the foregoing and related objects may be readily attained in a nozzle assembly for a laser cutting head comprising a receptacle of insulating material with a generally annular cross section and a central passage therethrough. Seated in the receptacle passage is a conductive insert having a body portion of generally annular cross section with a central passage extending therethrough, and the wall of the passage is internally threaded. An externally threaded neck portion of a conductive nozzle is threadably engaged in the threaded passage of the insert, and it has a central passage extending therethrough. Extending from the insert is a conductor which provides a conductive path from the nozzle to the cutting head through the insulating receptacle.

In the preferred embodiment, the conductive insert has a radially outwardly extending flange about its lower end which covers the lower end of the receptacle, and the body portion of the insert is adhesively bonded to the receptacle. The insert has a conical centering surface adjacent its lower end, and the nozzle has a cooperating conical centering surface thereon.

Desirably, the receptacle has a contact on its upper surface which is electrically connected to the insert by the conductor which extends through a longitudinal passage in the receptacle.

The laser cutting head has a body member with a passage extending downwardly therein for the laser beam, and a centering surface extending about its lower end which cooperates with a centering surface on the upper end of the receptacle. Thus, the receptacle passage functions to provide both as a centering surface for the insert and for the laser cutting head. The receptacle also has a longitudinally extending slot therein and the laser cutting head has a depending pin engaged therein to effect radial positioning thereof.

BRIEF DESCRIPTION OF THE DRAWINGS

The figure is a fragmentary sectional view of a laser cutting head with a nozzle assembly embodying the present invention.

DETAILED DESCRIPTION OF PREFERRED EMBODIMENT OF THE INVENTION

As seen in the attached drawing, a nozzle assembly embodying the present invention is assembled to the lower end of the body member 30 of a laser cutting head generally designated by the numeral 18 and which has a central passage for the laser beam.

The nozzle assembly includes of a receptacle generally designated by the numeral 10 and formed of insulating material in a generally annular cross section providing a coaxial passage 9 therethrough. An axial or longitudinal slot 16 is provided in its outer periphery, and a stepped configuration in its outer diameter provides a radially extending shoulder 31 thereabout. A depending locking pin 17 seated in the body member 30 of the cutting head 18 seats in the slot 16 to lock the receptacle 10 in a fixed radial orientation, and a coupling 19 threadably engaged on the body member 30 of the cutting head 18 has a radial shoulder 32 on its lower end which seats the radial shoulder 31 on the receptacle 10 to hold the receptacle 10 tightly against the lower end of the body member 30 of the cutting head 18. As seen, the neck 20 of the cutting head 18 has a peripheral recess 33 in which is seated the centering surface 21 at the upper end of the receptacle 10.

An insert generally designated by the numeral 4 is formed of metal or other conductive material with a generally annular body or bushing portion 8 which snugly seats within the passage 9 of the receptacle 10, and with a radially outwardly extending flange portion 24 which extends below the receptacle 10 to protect its lower end. The outer surface of the body portion 8 and the upper surface of the flange portion 24 are adhesively bonded to the adjacent surfaces of the receptacle 10 as indicated by the numerals 11. The central passage of the insert 4 has an internally threaded portion 6 and a downwardly outwardly centering flaring conical surface 7 is provided about the lower end of the passage therethrough.

The nozzle is generally designated by the numeral 1 and has a central neck portion 25 which is externally threaded at its upper end as indicated by the numeral 5. The neck portion is provided with a conical centering surface 26 at its lower end which cooperates with the centering surface 7 of the insert 4. As seen, the body portion 27 of the nozzle 1 has a large diameter passage 28 extending coaxially therein and a relatively small aperture 2 at its lower end. Extending radially outwardly from the body portion 27 is a flange 22 which has a milled edge 3 to facilitate rotation thereof to threadably engage or disengage the nozzle 1 from the threads of the insert 4.

To continue the conductive path from the nozzle 1, a conductive pin 13 extends from its seat 15 in the insert through a passage 12 in the receptacle 10 and terminates in the head 14 which is conductively coupled to the conductor 29 in the body member 30 of the cutting head 18. The conductor 29 in turn is connected to the measuring and control apparatus (not shown).

Although the conductor 13 from the insert 4 through the receptacle 10 may have different forms, a metal pin with a large head providing a contact surface is desirably employed and it can be soldered to the insert 4 after the insert and receptacle have been assembled.

Although the insert and nozzle may be fabricated from conductive resins, metals are preferably employed for temperature and wear resistance. Although non-conducting resins may be employed for the receptacle, ceramics are preferable for their temperature resistance.

It will be appreciated that the illustrated design of the receptacle and insert provides a large area interface for adhesive bonding and a minimum of special contours for the receptacle. However, if so desired, other forms of engagement may be employed.

As will also be appreciated, the centering and aligning surfaces of the several parts ensures proper alignment and assembly.

Thus, it can be seen from the foregoing detailed specification and drawings that the nozzle assembly of the present invention is simple to manufacture and assemble, and reliable in performance. The nozzle may be readily replaced while the remainder of the assembly will exhibit relatively long life.

Having thus described the invention, what is claimed is:

1. A nozzle assembly for a laser cutting head comprising:
   (a) a receptacle of insulating material having a generally annular cross section with a central passage therethrough;
   (b) a conductive insert having a body portion of generally annular cross section seated in said receptacle passage and having a central passage extending therethrough, the wall of said passage being threaded;
   (c) a conductive nozzle having an externally threaded central neck portion threadably engaged in said threaded passage of said insert and having a central passage extending therethrough; and
   (d) a conductor extending through said insulating receptacle from said insert.

2. The nozzle assembly in accordance with claim 1 wherein said conductive insert has a radially outwardly extending flange about its lower end which substantially protects the lower end of said receptacle.

3. The nozzle assembly in accordance with claim 1 wherein said body portion of said insert is adhesively bonded to said receptacle.

4. The nozzle assembly in accordance with claim 1 wherein said insert has a conical centering surface adjacent its lower end and said nozzle has a cooperating conical centering surface thereon.

5. The nozzle assembly in accordance with claim 1 wherein said receptacle has a contact on its upper surface which is electrically connected to said insert by said conductor which extends through a longitudinal passage in said receptacle.

6. A nozzle assembly for a laser cutting head comprising:
   (a) a generally annular receptacle of insulating material having a central passage therethrough;
   (b) a conductive insert having a generally annular body portion seated in said receptacle passage and having a central passage extending therethrough, the wall of said passage being threaded, said conductive insert having a radially outwardly extending flange about its lower end which substantially protects the lower end of said receptacle;
   (c) a conductive nozzle having an externally threaded central neck portion threadably engaged in said threaded passage of said insert and having a central passage therethrough, said insert having a conical centering surface adjacent its lower end and said nozzle having a cooperating conical centering surface thereon; and
   (d) a conductor extending through said insulating receptacle from said insert.

7. The nozzle assembly in accordance with claim 6 wherein said body portion of said insert is adhesively bonded to said receptacle.

8. The nozzle assembly in accordance with claim 6 wherein said receptacle has a contact on its upper surface which is electrically connected to said insert by said conductor which extends through a longitudinal passage in said receptacle.

9. In a laser cutting head, the combination comprising:
   (a) a body member having a passage extending downwardly therein for a laser beam;
   (b) a nozzle assembly releasably mounted on said body member and comprising:

(i) a receptacle of insulating material having a generally annular cross section with a central passage therethrough aligned with said passage in said body member;
(ii) a conductive insert having a body portion of generally annular cross section seated in said receptacle passage and having a central passage extending therethrough, the wall of said passage being threaded;
(iii) a conductive nozzle having an externally threaded central neck portion threadably engaged in said threaded passage of said insert and having a central passage extending therethrough; and
(iv) a conductor extending through said insulating receptacle from said insert.

10. The laser cutting head in accordance with claim 9 wherein said body member has a centering surface extending about its lower end and the upper end of said receptacle has a centering surface cooperating therewith.

11. The laser cutting head in accordance with claim 9 wherein said receptacle has a axially extending slot therein and said laser cutting head has a depending pin thereon which is engaged in said slot to effect radial positioning of said nozzle assembly.

12. The laser cutting head in accordance with claim 9 wherein said receptacle passage functions to provide both a centering surface for said insert and a centering surface for said laser cutting head.

13. The laser cutting head in accordance with claim 9 wherein said conductive insert has a radially outwardly extending flange about its lower end which substantially protects the lower end of said receptacle.

14. The laser cutting head in accordance with claim 9 wherein said body portion of said insert is adhesively bonded to said receptacle.

15. The laser cutting head in accordance with claim 9 wherein said insert has a conical centering surface adjacent its lower end and said nozzle has a cooperating conical centering surface thereon.

16. The laser cutting head in accordance with claim 9 wherein said receptacle has a contact on its upper surface which is electrically connected to said insert by said conductor which extends through a longitudinal passage in said receptacle.

* * * * *